United States Patent [19]

Sasur

[11] 4,026,094
[45] May 31, 1977

[54] COMBINATION RAKE AND GROUND COVER RETAINING DEVICE

[76] Inventor: Stanley Sasur, 31 Meadow Ave., Cumberland, R.I. 02864

[22] Filed: Oct. 6, 1975

[21] Appl. No.: 620,013

[52] U.S. Cl. .......................... 56/400.04; 56/400.21; 135/15 PE
[51] Int. Cl.² .......................................... A01D 7/06
[58] Field of Search ..... 56/400.01, 400.04, 400.16, 56/400.17, 400.18, 400.21; 135/15 PE

[56] References Cited

UNITED STATES PATENTS

| 524,215 | 8/1894 | Quigley | 56/400.21 |
|---|---|---|---|
| 892,532 | 7/1908 | Long | 56/400.21 |
| 1,092,522 | 4/1914 | Dowdle | 56/400.01 |
| 1,537,005 | 5/1925 | Carson | 56/400.21 |
| 1,652,260 | 12/1927 | Thompson | 56/400.21 |
| 3,408,803 | 11/1968 | Vanderveer | 56/400.01 |
| 3,870,300 | 3/1975 | Amendola | 56/400.04 |

Primary Examiner—J.N. Eskovitz
Attorney, Agent, or Firm—Salter & Michaelson

[57] ABSTRACT

A combination rake and ground cover retaining device that includes a holder in which a plurality of removable pins are mounted, the holder and pins as mounted therein defining a rake for preparing a ground surface for receiving the ground cover thereon, and the pins being removable from the holder and insertable into the ground for securing the ground cover in place.

4 Claims, 4 Drawing Figures

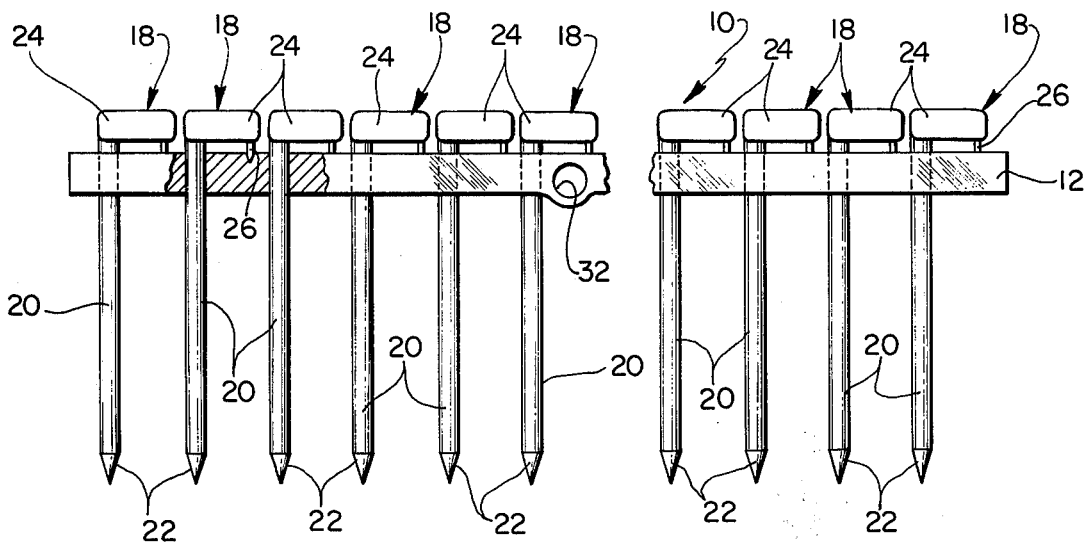
FIG. 1
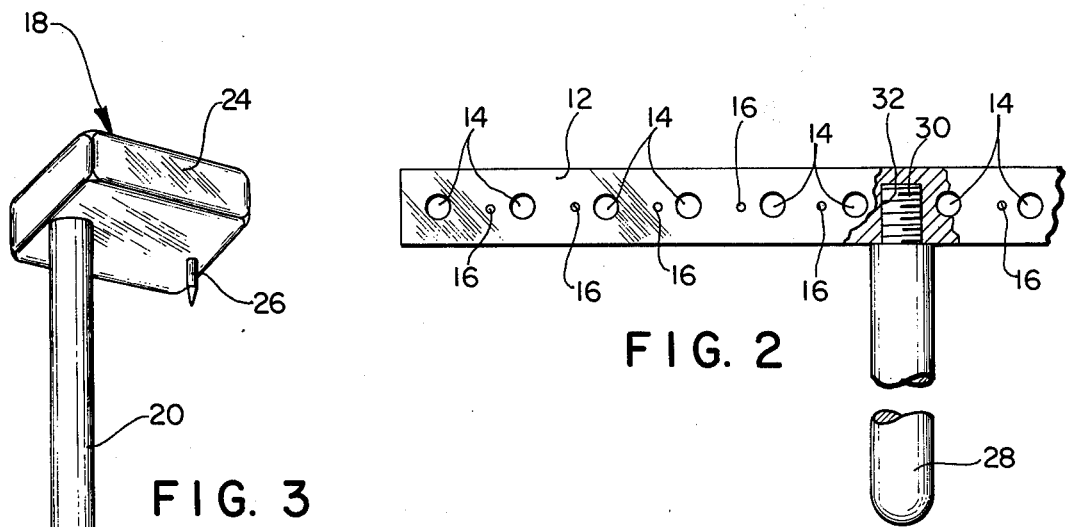
FIG. 3
FIG. 2
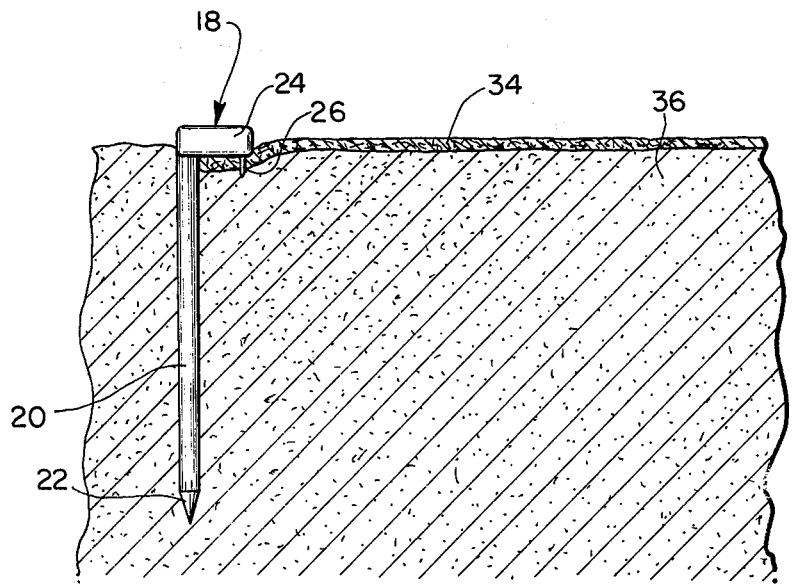
FIG. 4

COMBINATION RAKE AND GROUND COVER RETAINING DEVICE

BACKGROUND OF THE INVENTION

The present invention relates to a device that is used to prepare ground for receiving a ground cover and, after the ground preparing operation, is employed for securing the cover to the ground.

It is desirable prior to placing a blanket or the like on sand on a beach, or erecting a tent on ground, to prepare the sand or ground by smoothing it or removing debris therefrom. Normally, the usual procedure in preparing sand at a beach prior to placing a blanket thereon is to smooth the sand by hand and remove rocks, shells and other debris from the area on which the blanket is to be placed. This same procedure is normally followed prior to erecting a tent. However, such a ground or sand preparing operation is somewhat laborious, and furthermore the area to be prepared is not always properly cleared of debris or prepared for receiving a ground cover. Although a conventional rake or the like can be used for this purpose, such a device does have a limiting purpose because of the size thereof and would not normally be carried as part of equipment taken to the beach or to an area on which a tent is to be erected.

SUMMARY OF THE INVENTION

The present invention relates to a combination rake and ground cover retaining device and is usable to prepare an area of ground or sand for receiving a ground cover. For this purpose the device as embodied in the present invention includes an elongated holder having a plurality of openings formed therein in which a plurality of elongated ground pins are located. Each of the ground pins is removably mounted in an opening in the holder and is formed with an offset head thereon, the ground pins as located in the openings in the holder defining a rake therewith that can be utilized to prepare the ground for a ground cover. The ground pins are removable from the elongated holder and are insertable into the ground adjacent to the peripheral edges of the ground cover, whereby the offset head thereof is usable to engage the ground cover for securing it in place on the ground.

Accordingly, it is an object of the present invention to provide a combination rake and ground cover retaining device that includes a plurality of ground pins that are removably mounted in a holder and that are usable therewith as a rake and that are thereafter removed from the holder for insertion into the ground for securing a ground cover in place thereon.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a front elevational view with parts shown in section of the combination rake and ground cover retaining device embodied in the present invention;

FIG. 2 is an enlarged fragmentary top plan view of the device with parts shown in section and with the ground pins removed from the holder;

FIG. 3 is a bottom perspective view of one of the ground pins; and

FIG. 4 is a sectional view showing the insertion of a ground pin into sand and in engagement with a marginal edge of a ground cover for retaining the ground cover in place on the sand.

DESCRIPTION OF THE INVENTION

Referring now to the drawing and particularly to FIG. 1, the combination rake and ground cover retaining device embodied in the present invention is illustrated and is generally indicated at 10. The device 10 includes an elongated holder 12 in which a plurality of openings 14 are formed, the openings 14 being spaced from each other in the holder 12. It is contemplated that approximately twelve of the openings 14 will be formed in the holder 12; although, this number may be increased or decreased as required. As illustrated in FIG. 2, a plurality of indentations or recesses 16 are formed in the uppermost surface of the elongated holder 12, each of the recesses 16 being spaced between a pair of the openings 14.

Removably mounted in the openings 14 of the holder 12 are a plurality of ground pins each of which is generally indicated at 18. As more clearly illustrated in FIG. 3, each of the ground pins 18 includes an elongated shank portion 20 on the outermost end of which a point 22 is formed. Joined to the uppermost end of the shank 20 is a head 24 that is fixed to the shank 20 in offset relation so that a major portion of the head 24 projects outwardly with respect to the axis of the shank 20. Secured to the underside of the head of each ground pin 18 and extending downwardly in parallel relation with respect to the shank 20 thereof is a small retaining pin 26. As illustrated in FIG. 1, when the ground pin 18 are located in mounted position on the holder 12, the shank 20 of each ground pin extends through an opening 14; and the retaining pin of each ground pin 18 is received in a recess 16, the location of each pin 26 in a recess 16 providing for the spacing of the head 24 of a ground pin from the adjacent surface of the holder 12. With each of the ground pins 18 located as illustrated in FIG. 1, the shank 20 of each ground pin is disposed in parallel relation with respect to the others, and thus define a plurality of spaced tines and cooperate with the holder 12 to form the head of a rake. As further illustrated in FIG. 2, a handle 28 having a reduced threaded portion 30 formed on an end thereof is received in a threaded opening 32 that is formed in the holder 12, the handle 28 cooperating with the holder 12 and the ground pins 18 to form a complete rake construction.

In use of the device as a rake, and with the ground pins 18 mounted in the holder 12, a user may employ the device in the usual fashion such as raking and preparing sand for receiving a banket thereon or for preparing a ground area prior to the erecting of a tent. It is understood that in use of the device as a rake, the shanks 20 of the pins 18 cooperate to form the tines of a rake in the conventional manner. Although the device in the use thereof has also been described as including the handle 28, it is contemplated that the device can be used as a rack without the handle being attached thereto.

Following the removal of debris in the preparation of the sand or ground by the device in the form as illustrated in FIG. 1, a ground cover is thereafter located in place on the prepared ground. In order to firmly anchor the ground cover on the prepared area, each of the ground pins 18 is removed from the opening 14 in which it is located in the holder 12, it being understood that the shank 20 of each ground pin is slidably movable in the opening 14 in which it is inserted. After a blanket or ground cover 34 has been placed on the prepared surface of the sand 36, ground or the like, each of the pins 18 is inserted into the ground adjacent to the marginal edges of the ground cover 34 as illustrated in FIG. 4. In this connection, the head 24 of each ground pin 18 is located over the ground such that the offset portion thereof overlies a marginal edge of the ground cover 34, wherein the retaining pin 26 of each ground pin is received in the cover 34. Since the retaining pin 26 is relatively small, it is insertable into the cover without injuring the fabric thereof. It is seen that the retaining pins 26 penetrate and positively engage the marginal edges of the ground cover 34 and thus lock the ground pins 18 to the ground cover. With the shanks 20 of the ground pins 18 inserted into the ground in spaced relation arund the marginal portions of the ground cover 34, and with the retaining pins 26 penetrating the fabric of the ground cover, the ground cover is positively fixed on the surface of the sand or ground 36 and cannot be easily moved thereon, even by shifting or sliding of the individuals reclining thereon. It is also seen that the heads 24 of the ground pins 18 are formed with a relatively low profile which prevents the pins from being removed from their inserted position. Further, the low profile of the heads 24 of the inserted pins avoids injury to the feet of individuals who would be walking on or around the ground cover 34.

The device is compact in construction, and the ground pins 18 are quickly and easily removed from or replaced in the holder 12 in a simple operation. The device may be stored in a convenient location without requiring excessive space; and by forming all of the component parts of the device of a suitable plastic material, the device is resistent to wear due to normal use and weather.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A combination rake and ground cover retaining device, comprising an elongated holder having a plurality of openings formed therein in spaced relation along the length thereof, a plurality of elongated ground pins each of which includes a shank to which a head is secured at the uppermost end thereof, each shank of a ground pin extending in a direction perpendicular to said head and being frictionally mounted in an opening in said holder for selective removal therefrom, said ground pins cooperating with said holder to define a rake for preparing ground for receiving a ground cover thereon, a cover gripping pin secured to the underside of the head of each ground pin, each cover gripping pin being located in parallel relation to the shank of an adjacent ground pin and extending for only a portion of the length thereof, wherein the shank of each ground pin after removal from said holder is insertable into the ground adjacent to said ground cover, the head of each ground pin overlapping said ground cover and the cover gripping pins as secured to said heads extending into said ground cover and cooperating with the shanks of said ground pins to secure said ground cover to the ground, and a plurality of recesses formed in said holder in spaced relation to the holes formed therein and accommodating the ground cover gripping pins therein when the ground pins are mounted in the openings in said holder.

2. A combination rake and ground cover retaining device as claimed in claim 1, said cover gripping pins having a longitudinal dimension less than the thickness of said holer, so that said cover gripping pins extend into said recesses in said holder for only a portion of the thickness of said holder, when said ground pins are mounted in said holder.

3. A combination rake and ground cover retaining device as claimed in claim 1, the shank of each ground pin being offset with respect to the axis of the head thereof, wherein the offset portion of the head of each ground pin is engageable with a part of the ground cover for securing the ground cover to the ground, each of the cover gripping pins being secured to the head of a ground pin in offset relation with respect to the axis thereof.

4. A combination rake and ground cover retaining device as claimed in claim 1, a handle secured to said holder and defining means for manipulating said holder and the ground pins as mounted thereon during a ground preparing operation.

* * * * *